United States Patent
Chan et al.

(10) Patent No.: US 10,056,117 B1
(45) Date of Patent: Aug. 21, 2018

(54) DATA STORAGE DEVICE BASEPLATE DIVERTER AND DOWNSTREAM SPOILER

(71) Applicant: Western Digital Technologies, Inc., San Jose, CA (US)

(72) Inventors: Andre S. Chan, Palo Alto, CA (US); Ta-Chang Fu, San Jose, CA (US); Hitoshi Shindo, San Jose, CA (US); Takaaki Deguchi, Saratoga, CA (US); May Ching Kung, San Jose, CA (US); Myeong Eop Kim, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 16 days.

(21) Appl. No.: 15/592,621

(22) Filed: May 11, 2017

(51) Int. Cl.
*G11B 33/14* (2006.01)
*G11B 33/08* (2006.01)

(52) U.S. Cl.
CPC .............. *G11B 33/08* (2013.01); *G11B 33/14* (2013.01); *G11B 33/142* (2013.01); *G11B 33/148* (2013.01)

(58) Field of Classification Search
CPC ...... G11B 33/14; G11B 33/142; G11B 33/148
USPC ............................................ 360/97.13, 97.19
See application file for complete search history.

(56) References Cited

U.S. PATENT DOCUMENTS

| | | | | |
|---|---|---|---|---|
| 6,493,310 B1* | 12/2002 | Kim | ..................... | G11B 17/047 720/611 |
| 6,542,328 B2* | 4/2003 | Harrison | .............. | G11B 5/6005 360/97.14 |
| 6,891,696 B1 | 5/2005 | Ou-Yang et al. | | |
| 7,133,248 B2* | 11/2006 | Shin | ....................... | G11B 33/08 360/97.19 |
| 7,149,053 B2* | 12/2006 | Tadepalli | ............. | G11B 33/148 360/99.16 |
| 7,203,030 B2 | 4/2007 | Chan et al. | | |
| 7,535,671 B2* | 5/2009 | Suzuki | ................. | G11B 5/6005 360/97.15 |
| 7,545,600 B2 | 6/2009 | Sorrell et al. | | |
| 7,573,671 B2 | 8/2009 | Serizawa et al. | | |

(Continued)

OTHER PUBLICATIONS

E. Y. K. NG et al., Structure Optimization Study of Hard Disk Drives to Reduce Flow-Induced Vibration, The Open Numerical Methods Journal, Received Aug. 18, 2011, Revised Oct. 28, 2011, pp. 31-41, 2011, vol. 3, Bentham Open.

(Continued)

*Primary Examiner* — Jefferson Evans
(74) *Attorney, Agent, or Firm* — John D. Henkhaus

(57) ABSTRACT

A unitary enclosure base for a data storage device integrally includes a first surface beneath a bottom disk, a bypass channel formed with an entry area with a lower surface below the first surface, a second surface lower than the first surface and beneath an actuator arm that services the bottom surface of the bottom disk, and a flow diverter extending upward from the first surface and positioned upstream of the actuator arm. The diverter may be positioned relative to the bypass channel such that disk-generated gas flow is diverted into the bypass channel away from the actuator arm. The base may further include a spoiler extending upward from the first surface and positioned downstream of the actuator arm. The spoiler may be positioned to inhibit a wake effect upon the actuator arm.

23 Claims, 6 Drawing Sheets

(56) References Cited

U.S. PATENT DOCUMENTS

| | | | |
|---|---|---|---|
| 7,751,145 B1* | 7/2010 | Lin | G11B 5/6005 360/97.17 |
| 7,961,426 B2* | 6/2011 | Naruse | G11B 25/043 360/99.2 |
| 8,009,384 B1* | 8/2011 | Little | G11B 25/043 360/97.14 |
| 8,068,310 B2* | 11/2011 | Joo | G11B 33/1446 360/97.17 |
| 8,077,430 B2 | 12/2011 | Chan et al. | |
| 8,077,431 B2 | 12/2011 | Abe et al. | |
| 8,274,754 B2 | 9/2012 | Chan et al. | |
| 8,339,730 B2* | 12/2012 | Lim | G11B 5/5569 360/97.11 |
| 8,630,061 B2 | 1/2014 | Sudo et al. | |
| 8,743,509 B1* | 6/2014 | Heo | G11B 21/22 360/254.6 |
| 8,797,677 B2* | 8/2014 | Heo | G11B 25/043 360/97.2 |
| 9,406,333 B1* | 8/2016 | Horasart | G11B 19/2045 |
| 2003/0117746 A1* | 6/2003 | Kovinskaya | G11B 5/6005 360/97.14 |
| 2003/0151848 A1* | 8/2003 | Lee | G11B 33/1486 360/97.15 |
| 2005/0057854 A1* | 3/2005 | Khanna | G11B 5/54 360/128 |
| 2005/0185325 A1* | 8/2005 | Hur | G11B 5/6005 360/97.16 |
| 2006/0005214 A1* | 1/2006 | Kim | G11B 33/1446 720/648 |
| 2006/0139798 A1* | 6/2006 | Suzuki | G11B 5/6005 360/97.15 |
| 2007/0188914 A1* | 8/2007 | Gross | G11B 5/6005 360/97.14 |
| 2008/0094747 A1* | 4/2008 | Chan | G11B 25/043 360/97.14 |
| 2008/0100957 A1* | 5/2008 | Gross | G11B 25/043 360/97.14 |
| 2009/0279203 A1* | 11/2009 | Chan | G11B 5/012 360/97.11 |
| 2013/0120871 A1* | 5/2013 | Choi | G11B 25/043 360/75 |
| 2013/0135770 A1* | 5/2013 | Choi | G11B 25/043 360/97.13 |
| 2015/0146322 A1* | 5/2015 | Bi | G11B 19/2009 360/99.08 |

OTHER PUBLICATIONS

Sujit Kirpekar et al., A Study on the Efficacy of Airflow Mitigation Devices in Hard Disk Drives, Proceedings of WTC2005 World Tribology Congress III, Sep. 12-16, 2005, 2 pages, ASME, Washington D.C.

* cited by examiner

A-A

DATA STORAGE DEVICE BASEPLATE DIVERTER AND DOWNSTREAM SPOILER

FIELD OF EMBODIMENTS

Embodiments of the invention may relate generally to data storage devices such as hard disk drives, and more particularly to managing vibration associated with a head-stack assembly.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head uses a magnetic field to read data from and write data to the surface of a magnetic-recording disk. A write head makes use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Because the recording disks spin within an HDD during operation, gas flow is generated. Indeed, the air bearing slider (or, generally, gas beating slider) on which a read-write head is housed relies on such gas flow in order to fly over a disk in order to function as purposed. However, such gas flow generated within an HDD can have detrimental effects when impinging upon or interacting with he disk stack and the head stack assembly (HSA), such as by contributing to imparting unwanted flow induced vibration (FIV) upon the disks and/or HSA, for example. FIV can negatively impact head positioning accuracy thereby leading to track misregistration (TMR), which essentially refers to the mis-location of the read-write head relative to its desired location, of which there are numerous components. Hence, controlling the gas flow within an HDD is considered an ongoing design challenge. Furthermore, often the case may be that, in the overall HDD design, positively affecting the FIV associated with the disks or the HSA may negatively affect the FIV associated with the other.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Generally, approaches to managing vibration associated with a data storage device head-stack assembly are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of an Illustrative Operating Context

Embodiments may be used in the context of a digital data storage device (DSD), such as a hard disk drive (HDD). Thus, in accordance with an embodiment, a plan view illustrating an HDD 100 is shown in FIG. 1 to illustrate an exemplary operating context.

Figure 1:
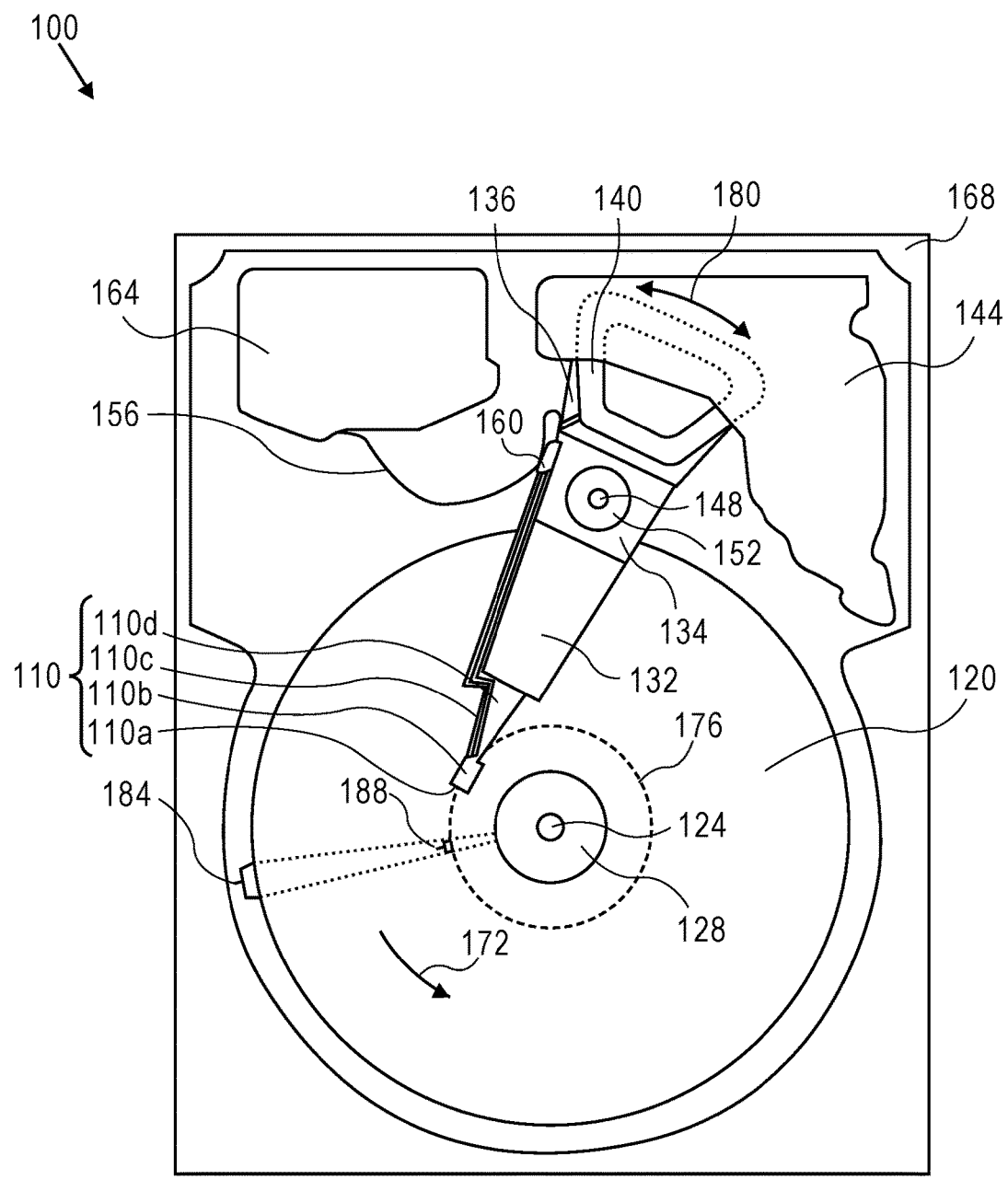
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Introduction

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Recall that a design that positively affects the flow-induced vibration (FIV) associated with the disks or the HSA may negatively affect the FIV associated with the other. Regardless, FIV associated with either component(s) has a deleterious effect on head positioning accuracy. For example, the torsion mode of vibration of an actuator arm can be driven by gas flow when there is too much flow energy in the disk stack layer remaining to impinge upon the affected arm. One restriction that may be encountered in controlling gas flow within an HDD may be the lack of useable volume within the drive that might be needed for incorporating control mechanisms into the drive. For a non-limiting example, minimizing the disk-to-base spacing may positively control the pressure RMS, which is one of the mechanisms that drives disk flutter, but may significantly restrict the space that could be used to control the flow impinging upon the bottom actuator arm. Another factor that is present with respect to the bottom actuator arm and corresponding read-write head, i.e., the arm and head closest to the baseplate (often termed "H0"), regardless of the particular structural and component configuration of an HDD, is that the flow between the bottom spinning disk (and likewise H0) and the baseplate is most likely different than the flow between higher adjacent spinning disks. Hence, controlling the flow relative to H0 can present unique challenges.

Figure 2A:
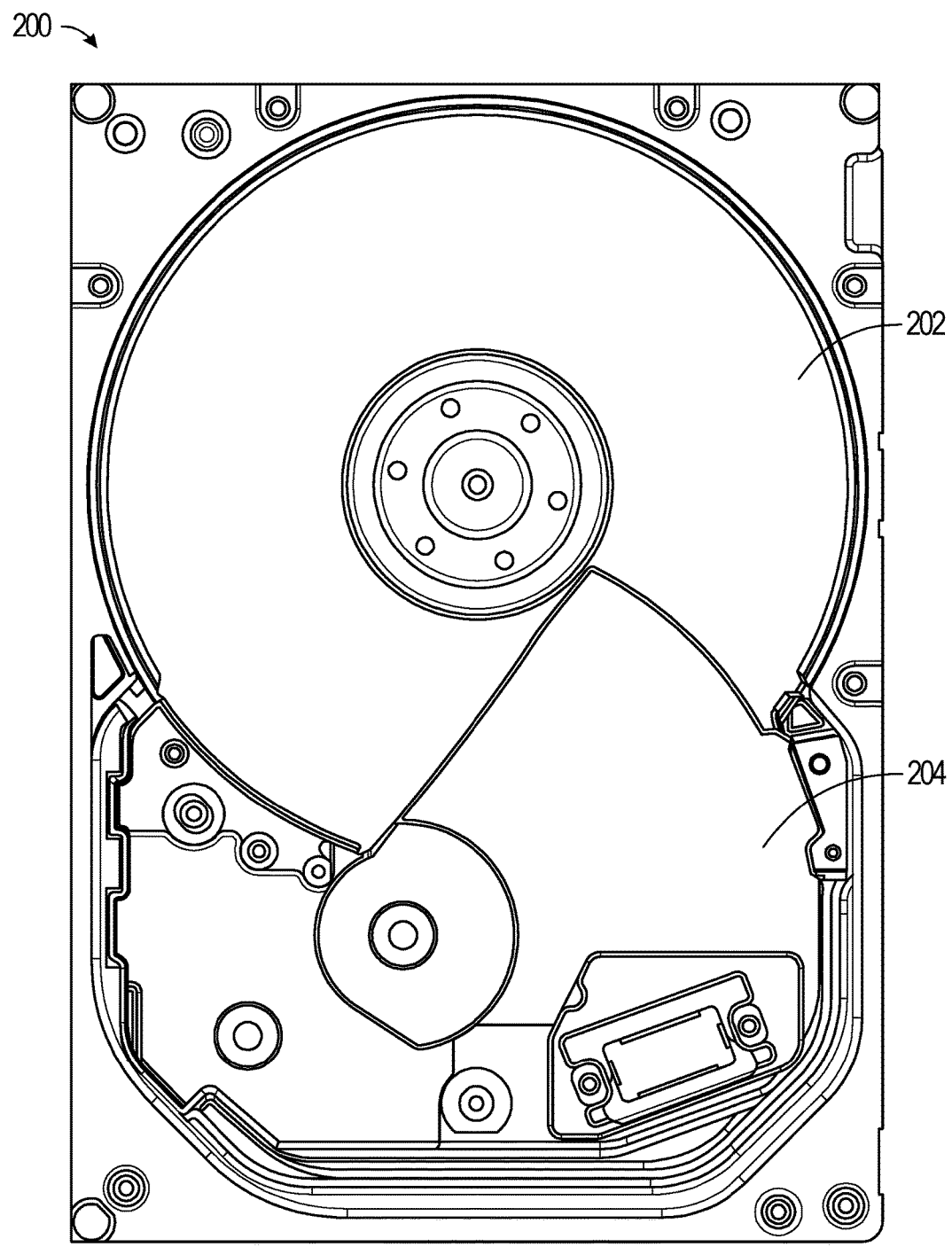
FIG. 2A is a top view illustrating a data storage device baseplate.
Figure 2B:
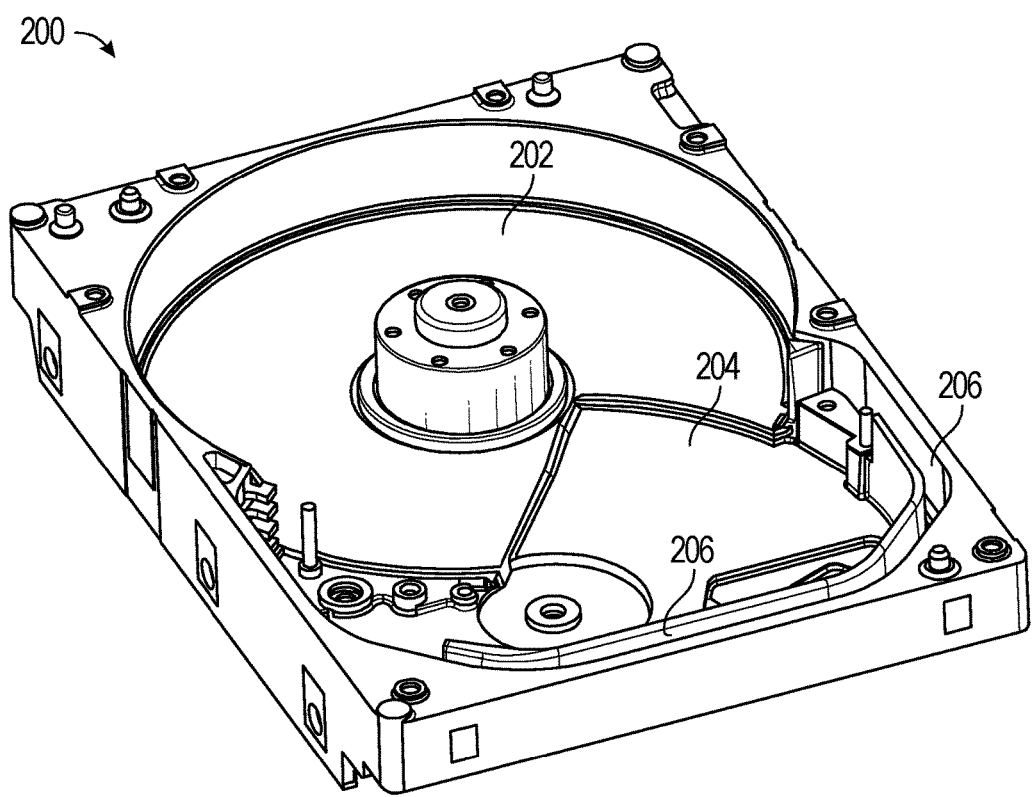
FIG. 2B is a perspective view illustrating the data storage device baseplate of FIG. 2A.

FIG. 2A is a top view illustrating a data storage device baseplate, and FIG. 2B is a perspective view illustrating the data storage device baseplate of FIG. 2A, both of which illustrate a "non-bypassed" H0 configuration. Enclosure base 200 (hereafter, "base 200") comprises a first annular surface 202 over which a stack of recording disks are installed on a spindle motor. Intersecting first surface 202 is a second annular surface 204, which is at a lower level than the first surface 202, and over which a head-stack assembly (HSA) (or grouping of actuator arms, e.g., an E-block or comb) is installed. Base 200 further comprises a flow bypass channel 206, which provides a flow path around the HSA.

With a fully-assembled, operating hard disk drive (HDD) that employs such a base 200, the lowest actuator arm of the HSA (also referred to herein as the "H0 actuator arm", with the corresponding read-write head referred to herein as "H0") may undesirably experience too much air or gas flow energy from the spinning disk stack, which can induce vibration (i.e., flow-induced vibration, or "FIV") of the arm. While track misregistration (TMR) is typically a result of multiple factors (e.g., servo, torque, disk vibration modes, arm vibration modes, etc.), arm modes are usually the dominant cause of TMR. In such an HDD configuration, H0 may be considered a "non-bypassed" head because there is nothing to change the direction of the flow from its path of least resistance, which generally corresponds to the rotation of the disk stack. Hence, not much if any of the flow will naturally enter the bypass channel 206 and, thus, the flow will attack or impinge upon H0 and its corresponding actuator arm and thereby cause FIV and, in turn, TMR. Furthermore, the FIV is even more acute with the move toward larger recording disks. For example, increasing the disk diameter from 95 mm to 97 mm can increase the fluid forces on the HSA approximately 10% at the outer diameter. Still further, the effect of FIV is even more problematic with modern higher areal density (a measure of the quantity of information bits that can be stored on a given area of disk surface) HDDs having higher TPI (tracks per inch).

Data Storage Device Baseplate with Integral Diverter and Spoiler

Figure 3A:
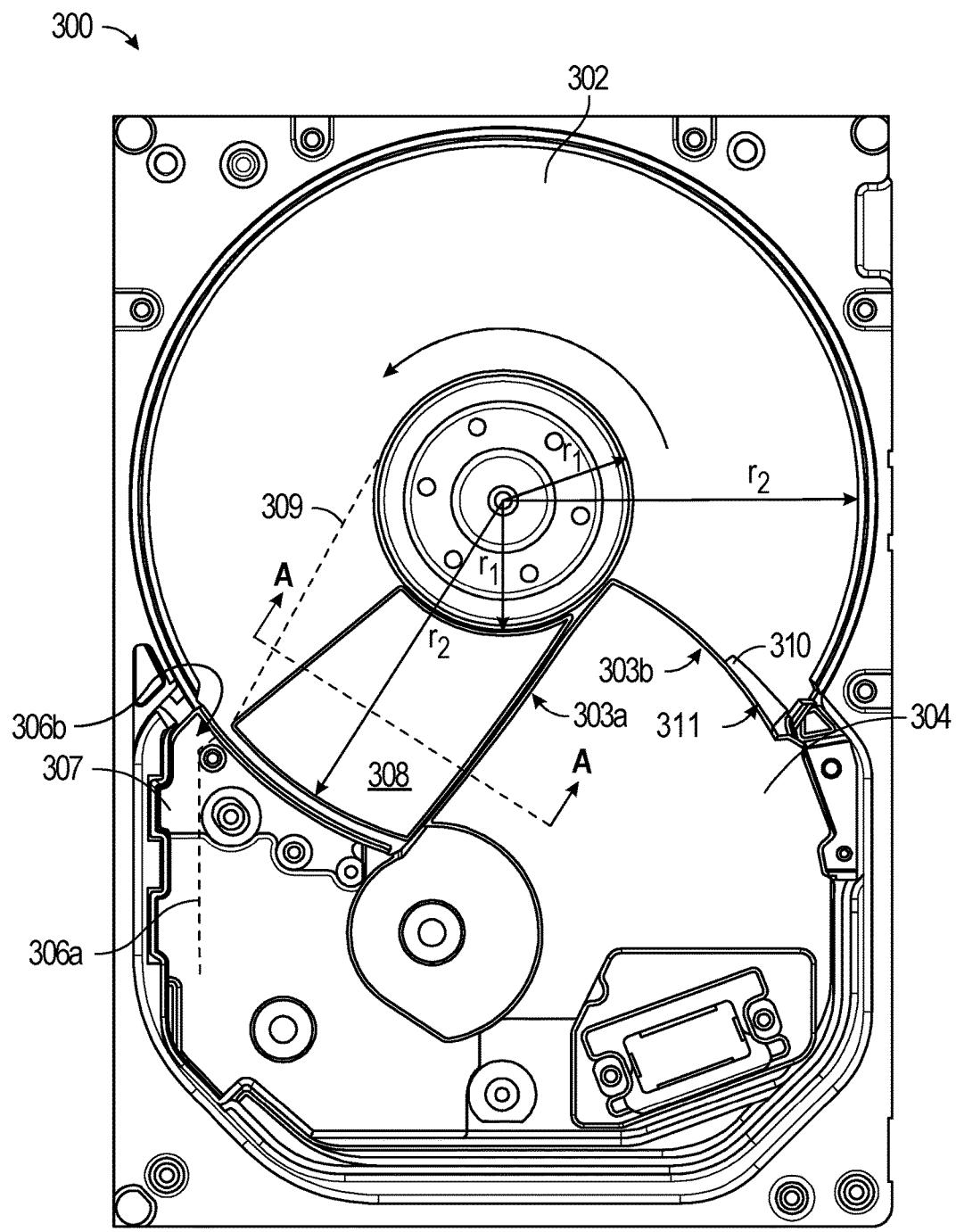
FIG. 3A is a top view illustrating a data storage device baseplate, according to an embodiment.
Figure 3B:
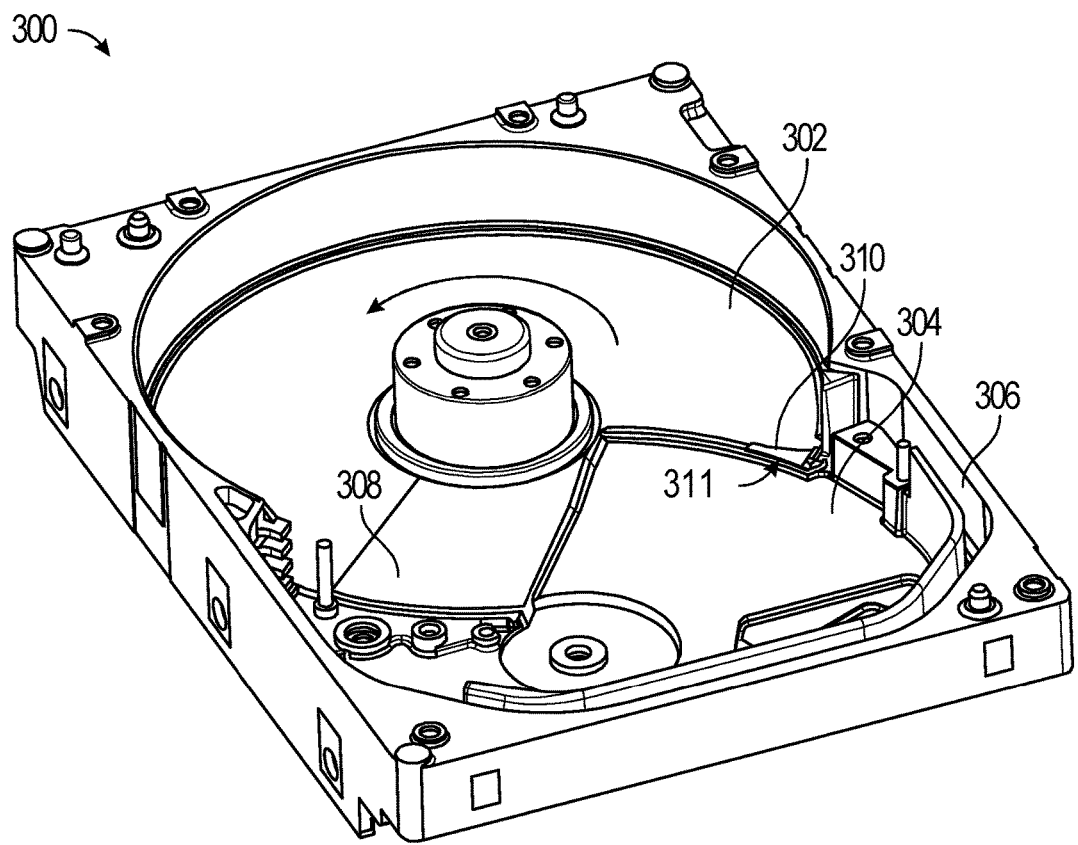
FIG. 3B is a perspective view illustrating the data storage device baseplate of FIG. 3A, according to an embodiment.

FIG. 3A is a top view illustrating a data storage device baseplate, and FIG. 3B is a perspective view illustrating the data storage device baseplate of FIG. 3A, according to an embodiment. Enclosure base 300 (hereafter, "base 300") comprises a first annular surface 302 over which a stack of recording disks are installed on a spindle motor. Intersecting first surface 302 is a second annular surface 304, which is at a lower level than the first surface 302, and over which a head-stack assembly (HSA) (or grouping of actuator arms, e.g., an E-block or comb) is installed. According to an embodiment, the first and second surfaces 302, 304 are substantially planar surfaces. According to an embodiment, the first and second surfaces are substantially parallel surfaces. The second surface 304 is considered to intersect the first surface 302 at intersection 303a and intersection 303b. Base 300 further comprises a flow bypass channel 306, which provides a flow path around the HSA. Note that a complete flow bypass channel may comprise the structural channel integrally formed into the base 300 (to which the element number 306 leads), as well as a portion 306a (depicted with dashed line) of the flow bypass channel that is formed by sub-components (e.g., voice-coil motor components, not shown here) installed into the base 300.

According to an embodiment, the base 300 comprises a first surface, which may be substantially planar and which may be annular or may comprise an annular section. With a fully-assembled, operating hard disk drive (HDD) that employs such a base 300, the first surface 302 is located beneath the disk stack and, more particularly, closest to and vertically-adjacent to a bottom surface of a bottom disk of the disk stack (see, e.g., recording medium 120 of FIG. 1). Base 300 further comprises an air and/or gas flow bypass channel, such as bypass channel 306 (augmented by portion 306a in a fully-assembled operating HDD). Such a bypass channel 306, 306a has an entry area 306b formed with a lower surface 307 at a level below the first surface 302. Continuing with this embodiment, base 300 further comprises a second surface, which may be substantially planar and which may be annular or may comprise an annular section, and which is lower than the level of the first surface 302. With a fully-assembled, operating hard disk drive (HDD) that employs such a base 300, the second surface 304 is located beneath the head-stack assembly (HSA) and, more particularly, closest to and vertically-adjacent to the H0 actuator arm of the HSA (see, e.g., carriage 134, arm 132, HGA 110 of FIG. 1). The second surface 304 being lower than the first surface 302 effectively forms a well, pocket, recess in which the lowest portion of the HSA can be positioned.

According to an embodiment, base 300 comprises a flow diverter 308 extending upward from the first surface 302, and positioned upstream of the HSA and corresponding bottom actuator arm. Flow diverter 308 functions as a flow control structure and, according to an embodiment, is positioned between the entry area 306b of bypass channel 306 and the H0 actuator arm. Another positional reference for the flow diverter 308 is that flow diverter 308 is positioned adjacent to first intersection 303a, according to an embodiment. As the first surface 302 has an inner radius $r_1$ and an outer radius $r_2$, likewise, the flow diverter 308 is shaped to comprise the inner radius $r_1$ and the outer radius $r_2$, according to an embodiment. Furthermore, the precise shape or footprint (i.e., top view) of flow diverter 308 may vary from implementation to implementation and, therefore, is not limited to the specific shape depicted in FIGS. 3A, 3B. For example, the leading edge or front face 308a of flow diverter 308 may be as depicted by dashed line 309 in FIG. 3A, or somewhere in between how dashed line 309 and front face 308a are depicted.

According to an embodiment, flow diverter 308 is positioned downstream from the entry area 306b of the bypass channel 306. Hence, flow diverter 308 does not block entry area 306b. According to an embodiment, flow diverter 308 is positioned relative to the bypass channel 306, 306a, 306b such that at least some of the flow that is generated by rotation, spinning of the disk stack is diverted and redirected into the bypass channel 306, such as into portion 306a via entry area 306b.

Figure 3C:
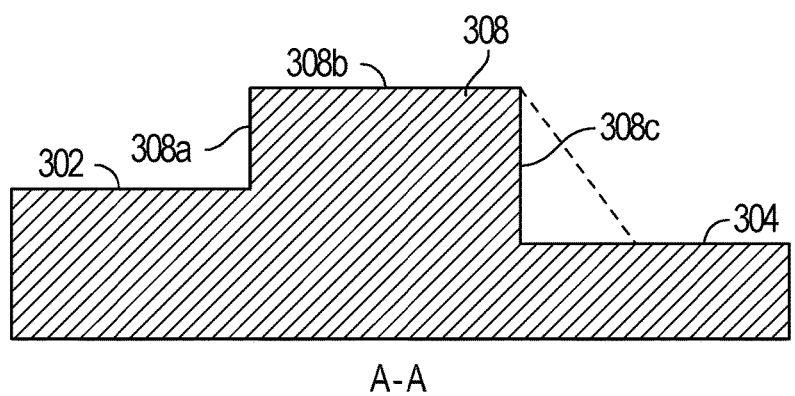
FIG. 3C is a cross-section side view illustrating a flow diverter structure, according to an embodiment.

FIG. 3C is a cross-section side view illustrating a flow diverter structure, according to an embodiment. FIG. 3C illustrates that, according to an embodiment, flow diverter 308 has a step-shaped cross-section, which steps up from the first surface 302 to a top surface 308b and steps back down to the second surface 304. Thus, flow diverter may comprise a front face 308a that is substantially normal to the first surface 302 and, therefore, is more normal to than parallel to flow generated by the spinning disks, according to embodiments. According to embodiments, and as depicted in FIGS. 3A-3C, flow diverter 308 has a back edge 308c that is positioned adjacent to the second surface 304. While the front face 308a of the flow diverter 308 may be blunt-shaped, the back surface or back edge 308c may be stepped or may gradually taper down to the second surface 304. Further, flow diverter 308 may further comprise a top planar surface 308b that is substantially parallel to the first and second surfaces 302, 304.

Returning to FIGS. 3A, 3B, according to an embodiment base 300 further comprises a spoiler 310 extending upward from the first surface 302 and positioned downstream of the HSA and corresponding bottom actuator arm. Spoiler 310 functions as a wake disrupter/disrupting structure and, according to an embodiment, comprises a leading edge or front edge 311 that is positioned adjacent to the second surface 304. Another positional reference for the spoiler 310 is that spoiler 310 is positioned downstream of the second surface 304, e.g., adjacent to the second intersection 303b. As best shown in FIG. 3A, according to an embodiment the spoiler 310 extends from at or near the outer radius $r_2$ of the first surface 302 in an inward direction toward the inner radius $r_1$ of the first surface 302. Stated otherwise, the spoiler 310 extends from the outer circumference of the first surface 302 toward the inner circumference of the first surface 302.

According to an embodiment, the spoiler 310 is positioned such that unstable wakes associated with the flow generated by the spinning disks and that shed off the HSA, in particular the H0 actuator arm, are disrupted. Stated otherwise, the spoiler 310 creates a stagnation zone, i.e., slower more stable flow, favorable higher pressure (which is a "quieter" flow), for the H0 actuator arm to operate in, and thus less impactful on the FIV and less deleterious to the head positioning and track following, especially at the disk outer diameter area.

To generalize, each of the flow diverter 308 and the spoiler 310 independently affects the H0 actuator arm and suspension vibration modes, the flow diverter 308 by redirecting upstream flow into the bypass channel 306 and the spoiler 310 by disrupting unstable wakes. Overall, these structural features lower the forcing function and its effect on the HSA. It is also noteworthy that each of the flow diverter 308 and spoiler 310 are integrally-formed as part of a unitary baseplate components. For example, if the base 300 part is formed by casting, then the flow diverter 308 and the spoiler 310 are part of the cast part, rather than assembled into or with the base 300 as separate parts. Fewer parts typically equate to easier manufacturing and can lead to a lower cost product.

Method for Controlling Gaseous Flow in a Data Storage Device

Figure 4:
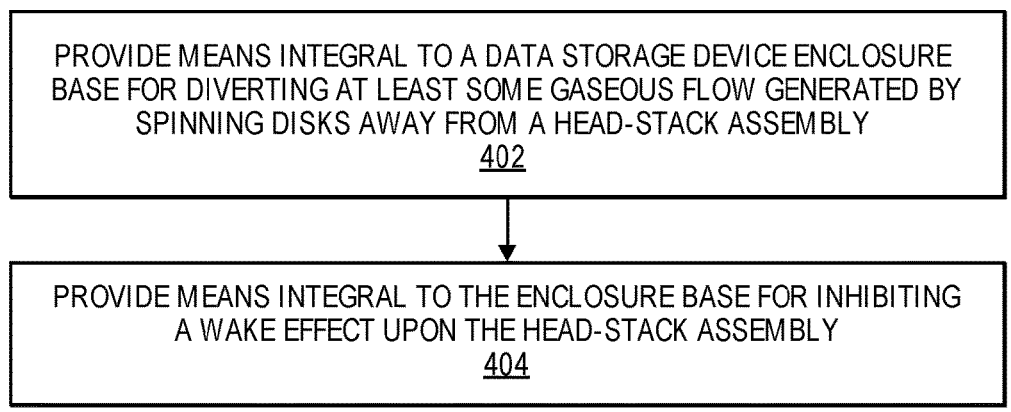
FIG. 4 is a flow diagram illustrating a method for controlling gaseous flow in a data storage device, according to an embodiment.

FIG. 4 is a flow diagram illustrating a method for controlling gaseous flow in a data storage device, according to an embodiment. For example, the method of FIG. 4 could be employed in a hard disk drive (HDD) enclosure base such as illustrated and described in reference to FIGS. 3A-3C, where the HDD houses a head-stack assembly (HSA) vertically adjacent to and separated from the base and spinning disks that generate gaseous flow.

At block 402, means are provided, integral to a data storage device enclosure base, for diverting at least some gaseous flow generated by the spinning disks away from the HSA. For example, means illustrated and described in reference to FIGS. 3A-3C may be utilized to redirect flow away from the HSA and, hence, lower the deleterious effects on head positioning, such as non-repeatable runout (NRRO) for example.

At block 404, means are provided, integral to the enclosure base, for inhibiting a wake effect upon the HSA. For example, means illustrated and described in reference to FIGS. 3A-3C may be utilized to disrupt unstable wakes from impinging upon the HSA and, hence, lower the deleterious effects on head positioning, such as non-repeatable runout (NRRO) for example.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A data storage device comprising:
    a plurality of recording disk media rotatably mounted on a spindle;
    a head slider comprising a read-write transducer configured to read from and to write to a bottom surface of a bottom one of said plurality of disk media;
    a rotary actuator configured to move said head slider to access portions of said bottom surface of said bottom disk media;
    an actuator arm coupled with and between said rotary actuator and said head slider; and
    a unitary enclosure base enclosing said bottom disk media, said head slider, and said actuator arm, wherein said enclosure base integrally comprises:
        a planar first surface beneath said bottom disk media,
        a gas flow bypass channel having an entry area formed with a lower surface at a level below said first surface,
        a planar second surface beneath said actuator arm, wherein said second surface is lower than said first surface, and
        a flow diverter extending upward from said first surface and positioned upstream of said actuator arm.

2. The data storage device of claim 1, wherein said flow diverter is positioned downstream from said entry area of said bypass channel.

3. The data storage device of claim 1, wherein said flow diverter is positioned relative to said bypass channel such that at least some gas flow generated by rotation of one or more of said plurality of disk media is diverted into said bypass channel.

4. The data storage device of claim 1, wherein said flow diverter comprises a front face substantially normal to said first surface.

5. The data storage device of claim 1, wherein a back edge of said flow diverter is positioned adjacent to said second surface.

6. The data storage device of claim 1, wherein said first surface comprises an inner radius and an outer radius, and wherein said flow diverter comprises said inner radius and said outer radius.

7. The data storage device of claim 1, wherein said flow diverter comprises a top planar surface substantially parallel with said first surface and said second surface.

8. The data storage device of claim 1, wherein said enclosure base further comprises:
a spoiler extending upward from said first surface and positioned downstream of said actuator arm.

9. The data storage device of claim 8, wherein a front edge of said spoiler is positioned adjacent to said second surface.

10. The data storage device of claim 8, wherein said first surface comprises an inner radius and an outer radius, and wherein said spoiler extends from said outer radius in an inward direction.

11. A data storage device comprising:
a plurality of recording disk media rotatably mounted on a spindle;
a head slider comprising a read-write transducer configured to read from and to write to a bottom surface of a bottom one of said plurality of disk media;
a voice coil actuator configured to move said head slider to access portions of said bottom disk media;
an actuator arm coupled with said actuator and with said head slider; and
an enclosure base integrally comprising:
a first surface beneath said bottom disk media,
a second surface beneath said actuator arm, wherein said second surface is lower than said first surface, and
a wake disrupter extending upward from said first surface and positioned downstream of said second surface and configured to disrupt unstable wakes associated with airflow generated by said disk media when spinning and that shed off said actuator arm.

12. The data storage device of claim 11, wherein a front-most feature of said wake disrupter is positioned adjacent to said second surface.

13. The data storage device of claim 11, wherein said wake disrupter is positioned such that wakes shed off said actuator arm are disrupted.

14. The data storage device of claim 11, wherein said first surface comprises an inner circumference and an outer circumference, and wherein said wake disrupter extends from said outer circumference toward said inner circumference.

15. The data storage device of claim 11, wherein said enclosure base further comprises:
a bypass channel having an entry area formed with a lower surface at a level below said first surface,
a flow control structure extending upward from said first surface and positioned between said entry area of said bypass channel and said actuator arm.

16. The data storage device of claim 15, wherein said flow control structure is positioned relative to said bypass channel such that at least some gas flow generated by rotation of said bottom disk media is redirected toward said entry area of said bypass channel.

17. The data storage device of claim 15, wherein said flow control structure comprises a front face more normal than parallel to gas flow generated by rotation of one or more of said plurality of disk media.

18. The data storage device of claim 15, wherein said first surface comprises an inner circumference and an outer circumference, and wherein said flow control structure comprises an inner radius consistent with said inner circumference and an outer radius consistent with said outer circumference.

19. The data storage device of claim 15, wherein said flow control structure comprises a top surface above said first and second surfaces.

20. A hard disk drive enclosure base comprising:
an annular-section first surface;
an annular-section second surface intersecting said first surface at a first intersection and at a second intersection, wherein said second surface is lower than said first surface;
a flow diverter extending upward from said first surface and positioned adjacent to said first intersection; and
a spoiler extending upward from said first surface and positioned adjacent to said second intersection.

21. The enclosure base of claim 20, wherein said first surface comprises an inner radius and an outer radius, and wherein said flow diverter comprises said inner radius and said outer radius.

22. A hard disk drive comprising the enclosure base of claim 20.

23. A method for controlling gaseous flow in a data storage device housing a head-stack assembly (HSA) vertically adjacent to and separated from a unitary enclosure base and spinning disks that generate said gaseous flow, the method comprising:
providing means integrally formed as part of a said unitary enclosure base for diverting at least some said flow generated by said spinning disks away from said HSA; and
providing means integrally formed as part of said unitary enclosure base for inhibiting a wake effect upon said HSA.

* * * * *